(12) United States Patent
Oonishi et al.

(10) Patent No.: US 11,914,601 B2
(45) Date of Patent: Feb. 27, 2024

(54) RE-RANKING DEVICE

(71) Applicant: NTT DOCOMO, INC., Chiyoda-ku (JP)

(72) Inventors: Anna Oonishi, Chiyoda-ku (JP); Satoshi Kawasaki, Chiyoda-ku (JP); Yusuke Fukazawa, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/638,142

(22) PCT Filed: Aug. 7, 2020

(86) PCT No.: PCT/JP2020/030475
§ 371 (c)(1),
(2) Date: Feb. 24, 2022

(87) PCT Pub. No.: WO2021/039372
PCT Pub. Date: Mar. 4, 2021

(65) Prior Publication Data
US 2022/0300519 A1   Sep. 22, 2022

(30) Foreign Application Priority Data

Aug. 29, 2019   (JP) .................................. 2019-157215

(51) Int. Cl.
*G06F 16/00*   (2019.01)
*G06F 16/2457*   (2019.01)
(Continued)

(52) U.S. Cl.
CPC ...... *G06F 16/24578* (2019.01); *G06F 16/248* (2019.01); *G06F 16/285* (2019.01); *G06F 16/335* (2019.01)

(58) Field of Classification Search
CPC .................................................. G06F 16/24578
(Continued)

(56) References Cited

U.S. PATENT DOCUMENTS 7,827,170 B1 * 11/2010 Horling ................... G06F 16/93
707/722
8,583,632 B2 * 11/2013 Libes ..................... G06Q 30/08
707/723

(Continued)

FOREIGN PATENT DOCUMENTS

JP   2011-227922 A   11/2011
JP   2012-53922 A   3/2012

OTHER PUBLICATIONS

International Preliminary Report on Patentability and Written Opinion dated Mar. 10, 2022 in PCT/JP2020/030475, 6 pages.

(Continued)

*Primary Examiner* — Alexandria Y Bromell
(74) *Attorney, Agent, or Firm* — Oblon, McClelland, Maier & Neustadt, L.L.P.

(57) ABSTRACT

Provided is a re-ranking device that enables a re-ranking process with less possibility of decrease in accuracy due to shortage of data. A re-ranking device 100 includes an input unit 101 that receives a search query from one user, a re-ranking model storage unit 106 that stores a plurality of re-ranking models prepared in accordance with common information of a plurality of users, a search unit 102 that performs a search on the basis of the search query and obtains a search result, and a re-ranking processing unit 107 that selects one re-ranking model on the basis of common information of the one user and performs a re-ranking process on the search result using the one re-ranking model.

15 Claims, 8 Drawing Sheets

(51) Int. Cl.
  *G06F 16/248* (2019.01)
  *G06F 16/28* (2019.01)
  *G06F 16/335* (2019.01)

(58) Field of Classification Search
  USPC .................................................. 707/723
  See application file for complete search history.

(56) References Cited

U.S. PATENT DOCUMENTS

| | | | | |
|---|---|---|---|---|
| 9,092,510 | B1* | 7/2015 | Stets, Jr. | G06F 16/3326 707/707 |
| 9,489,461 | B2* | 11/2016 | Sundaresan | G06F 16/24578 707/707 |
| 2006/0064411 | A1* | 3/2006 | Gross | G06F 16/9535 707/707 |
| 2007/0214131 | A1* | 9/2007 | Cucerzan | G06F 16/951 707/707 |
| 2007/0233671 | A1* | 10/2007 | Oztekin | G06F 16/9535 707/707 |
| 2011/0208730 | A1* | 8/2011 | Jiang | G06F 16/951 707/738 |
| 2012/0158685 | A1* | 6/2012 | White | G06F 16/9535 707/723 |
| 2012/0239646 | A1* | 9/2012 | Bailey | G06F 16/334 707/707 |
| 2013/0246412 | A1* | 9/2013 | Shokouhi | G06F 16/9535 707/707 |
| 2017/0357650 | A1* | 12/2017 | de Almeida Forjaz de Lacerda | G06F 16/951 707/707 |
| 2018/0121429 | A1* | 5/2018 | Agrawal | G06F 16/3326 707/707 |
| 2018/0189282 | A1* | 7/2018 | Hartlaub | G06F 16/437 707/707 |
| 2018/0232450 | A1* | 8/2018 | Bivens | G06F 16/93 707/707 |
| 2019/0147110 | A1* | 5/2019 | Wei | G06F 16/258 707/747 |
| 2019/0354422 | A1* | 11/2019 | Xu | H04L 41/069 707/707 |
| 2020/0311092 | A1* | 10/2020 | Thomas | G09B 7/02 707/707 |
| 2021/0004420 | A1* | 1/2021 | Mittal | G06F 16/9535 707/707 |
| 2021/0012031 | A1* | 1/2021 | Rich | G06F 21/6254 707/707 |

OTHER PUBLICATIONS

International Search Report dated Oct.6, 2020 in PCT/JP2020/030475 filed on August 7, 2020, 2 pages.

* cited by examiner

*Fig.2*

LOG DATA

| No. | SEARCH QUERY | CLICKED POI | SEARCH RESULT LIST | AGE | ADDRESS | OCCUPATION |
|---|---|---|---|---|---|---|
| 1 | DEZUNI- | DISNEYLAND | 1.DISNEYLAND<br>2.DISNEYSEA<br>3.DISNEY STORE<br>... | 34 | TOKYO | MANUFAC-TURING |
| ... | ... | ... | ... | ... | ... | ... |
| 3 | SKYTREE | TOKYO SKYTREE | 1.TOKYO SKYTREE<br>2.TOKYO SOLAMACHI<br>3.ASAKUSA...<br>... | 50 | TOKYO | SELF-EMPLOYED |
| ... | ... | ... | ... | ... | ... | ... |

Fig.4

(a) CONVERSION INTO FEATURE VALUES

| USER ID | SEARCH QUERY | CLICK LOG | DEGREE OF MATCHING BETWEEN SEARCH QUERY AND CLICK LOG | DIFFERENCE BETWEEN SEARCH QUERY AND CLICK LOG | CONTENT OF HIRAGANA |
|---|---|---|---|---|---|
| 1 | DEZUNI- | DISNEYLAND | 0 | 4 | 100 |
| 2 | DIZUNI- | DISNEYLAND | 0 | 3 | 100 |
| 3 | SKYTREE | TOKYO SKYTREE | ... | ... | ... |
| 4 | SUKAI | TOKYO SKYTREE | ... | ... | ... |

⇩ CLUSTERING (b) CLUSTER 1

| USER ID | SEARCH QUERY | CLICK LOG | DEGREE OF MATCHING BETWEEN SEARCH QUERY AND CLICK LOG | DIFFERENCE BETWEEN SEARCH QUERY AND CLICK LOG | CONTENT OF HIRAGANA |
|---|---|---|---|---|---|
| 1 | DEZUNI- | DISNEYLAND | 0 | 4 | 100 |
| 2 | DIZUNI- | DISNEYLAND | 0 | 3 | 100 |
| ... | ... | ... | ... | ... | ... |

CLUSTER 2

| USER ID | SEARCH QUERY | CLICK LOG | DEGREE OF MATCHING BETWEEN SEARCH QUERY AND CLICK LOG | DIFFERENCE BETWEEN SEARCH QUERY AND CLICK LOG | CONTENT OF HIRAGANA |
|---|---|---|---|---|---|
| 3 | SKYTREE | TOKYO SKYTREE | | | |
| 4 | SUKAI | TOKYO SKYTREE | | | |
| ... | ... | ... | | | |

⇩ ACQUIRE LOG INFORMATION OF EACH CLUSTER (c) LOG INFORMATION

| USER ID | SEARCH QUERY | CLICK LOG | SEARCH RESULT LIST | ATTRIBUTE INFORMATION |
|---|---|---|---|---|
| 1 | DEZUNI- | DISNEYLAND | ... | ... |
| 2 | DIZUNI- | DISNEYLAND | ... | ... |

⇩ GENERATE RE-RANKING MODEL

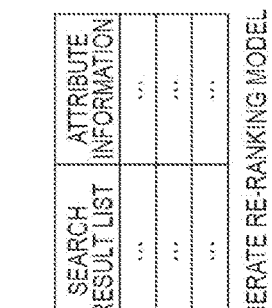

RE-RANKING MODEL #1

(d) LOG INFORMATION

| USER ID | SEARCH QUERY | CLICK LOG | SEARCH RESULT LIST | ATTRIBUTE INFORMATION |
|---|---|---|---|---|
| 3 | SKYTREE | TOKYO SKYTREE | ... | ... |
| 4 | SUKAI | TOKYO SKYTREE | ... | ... |
| ... | ... | ... | ... | ... |

⇩ GENERATE RE-RANKING MODEL

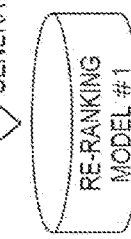

RE-RANKING MODEL #2

*Fig.7*
(a)
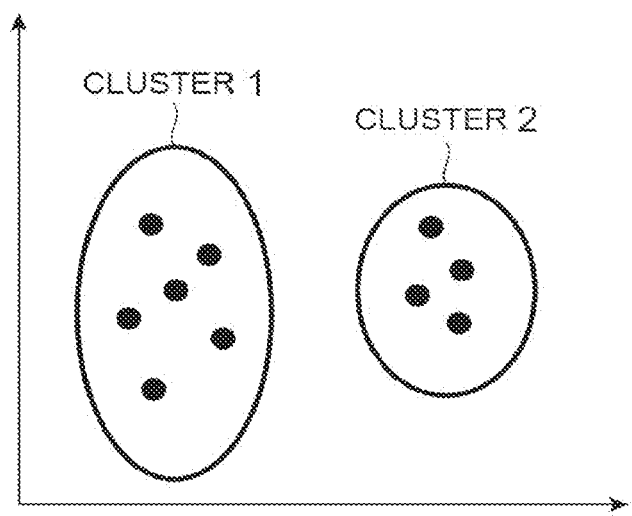
(b)
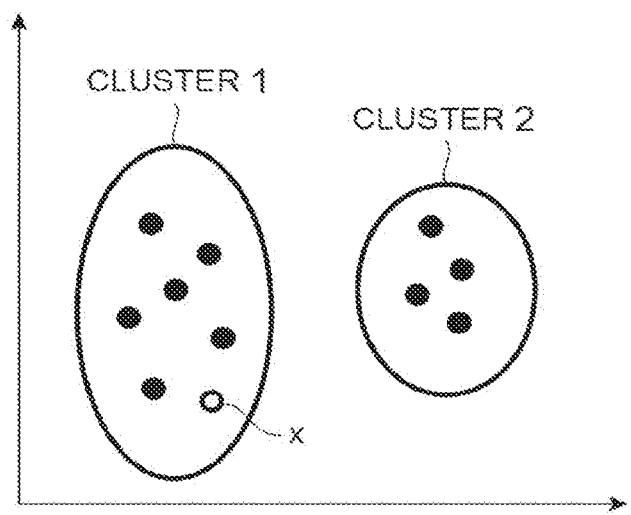

RE-RANKING DEVICE

TECHNICAL FIELD

The present invention relates to a re-ranking device that performs a ranking process in information search.

BACKGROUND ART

As disclosed in Patent Literature 1, a system, method, and interface that provide personalized search and information access are known.

CITATION LIST

Patent Literature

PTL1: Japanese Unexamined Patent Publication No. 2012-53922

SUMMARY OF INVENTION

Technical Problem

The system, method, and interface device that provide personalized search and information access according to the above-described related art have the following problem. To create a search model or a re-ranking model different from user to user, a large volume of data and a large amount of feature values using a user's actual log are required. However, in an actual search log, the amount of data is too small to create an individual specific model, and the item of the log to be used for a feature value is sparse. Thus, the system, method, and interface device that provide personalized search and information access according to the above-described Patent Literature 1 have the problem that data for displaying more personalized results desired by a user is insufficient, which makes it difficult to obtain personalized results.

To solve the above problem, an object of the present invention is to provide a re-ranking device that enables a re-ranking process with less possibility of decrease in search accuracy due to shortage of data.

Solution to Problem

To solve the above problem, a re-ranking device according to the present invention includes an input unit configured to receive a search query from one user, a plurality of re-ranking models prepared in accordance with common information of a plurality of users, a search unit configured to perform a search on the basis of the search query and obtain a search result, and a re-ranking processing unit configured to select one re-ranking model on the basis of common information of the one user and perform a re-ranking process on the search result using the one re-ranking model.

According to the present invention, since the re-ranking model is prepared in accordance with the common information of a plurality of users, the problem of shortage of data during generation of the model is solved compared with the case where the re-ranking model is prepared for each user, which enables a highly accurate re-ranking process.

Advantageous Effects of Invention

The present invention enables a highly accurate re-ranking process with use of a re-ranking model with no shortage of data.

BRIEF DESCRIPTION OF DRAWINGS

FIG. 2 is a view showing a specific example of log information stored in a log database 109;

FIG. 4 is a schematic diagram showing generation of a re-ranking model;

FIG. 7 is a schematic diagram when performing a clustering process of log information.

DESCRIPTION OF EMBODIMENTS

Embodiments of the present invention are described hereinafter with reference to the attached drawings. Note that, where possible, the same elements are denoted by the same reference symbols and redundant description thereof is omitted.

Figure 1:
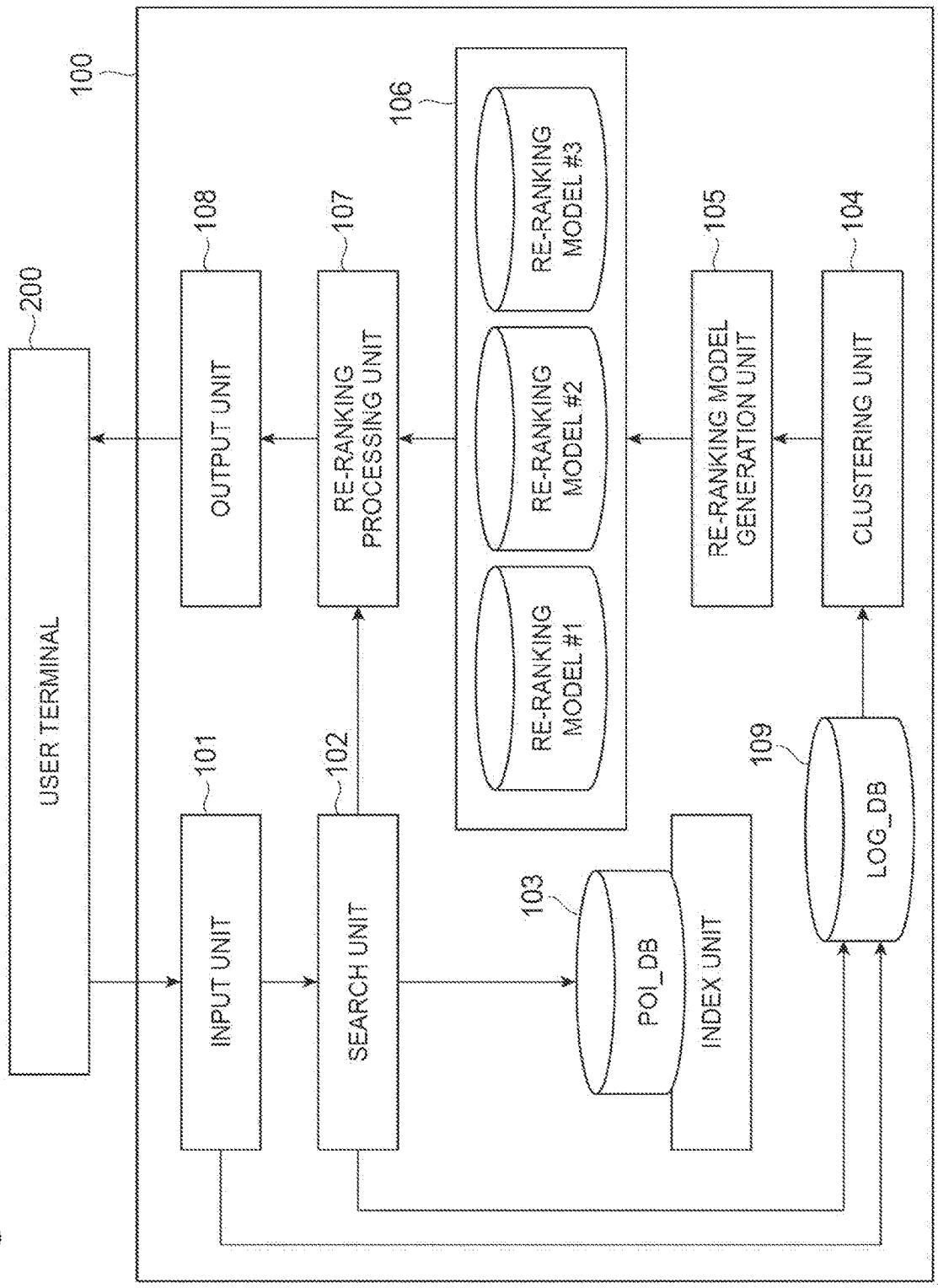
FIG. 1 is a block diagram of a re-ranking device 100 in facility information search according to an embodiment.

A configuration of a re-ranking device 100 in facility information search according to this embodiment is described hereinafter. FIG. 1 is a block diagram of the re-ranking device 100 in facility information search according to this embodiment. The re-ranking device 100 in facility information search according to this embodiment includes an input unit 101, a search unit 102, an index unit 103, a clustering unit 104, a re-ranking model generation unit 105, a re-ranking model storage unit 106, a re-ranking processing unit 107, an output unit 108, and a log database 109. Although facility information search; which is so-called POI (Point of Interest) search, is used as an example in the following description, the present invention is applicable also to general search.

The input unit 101 is a part that receives a character string input from a user terminal 200 through a communication network or the like. Further, the input unit 101 stores, into the log database 109, a POI clicked by a user in a search result list output from the output unit 108 to the user terminal 200.

The search unit 102 is a part that receives the received character string and matches with the index unit 103 having a database of POIs stored in a search system, and thereby acquires a search result list containing the relevant POI. The search unit 102 stores the acquired search result list as log information into the log database 109, and also outputs it to the re-ranking processing unit 107 to perform a re-ranking process.

The index unit 103 has a POI database, and outputs, to the search unit 102, a search result list containing a corresponding POI on the basis of an inquiry (character string) from the search unit 102.

The clustering unit 104 is a part that performs a clustering process on log information of the log database 109 and thereby classifies (clusters) the information into a specified number of clusters. This clustering process may be k-means, for example. For clustering, the clustering unit 104 extracts a feature value from the log information. This feature value is information indicating the tendency of search, such as whether to use hiragana (Japanese syllabary characters) and a prolonged sound mark (or its content etc.) in a search query, the number of words (per N words), and the amount of unnecessary character strings, for example. The amount of unnecessary character strings in the search query "Can you . . . ?", for example, is the number of character strings or its content of the part "can you". This is information that can be obtained by using morphological analysis or the like.

Further, the degree of matching in character strings between a search query and a click log (POT title etc.) or a difference in character strings between them is extracted as the feature value. The degree of matching is the percentage of matching or the number of matches of characters. The difference is a difference in the number of characters when a click log character string>a search query.

Alternatively, the feature value may be whether to use voice as a means of input, the type of a terminal used and the like. Although the above-described feature value is information indicating the tendency of search, clustering may be done on the basis of a user attribute (age, gender, etc.) or using both of them. In this embodiment, the shortage of data is solved by clustering using an item common to users who make a search.

The re-ranking model generation unit 105 is a part that generates a re-ranking model on the basis of the feature values derived from the log information on which the clustering process is done by the clustering unit 104. Known machine learning processing (e.g., rankSVM) is performed by using a search query and a search result list in the log information clustered on the basis of each feature value as an explanatory variable and using a clicked POI as a response variable. A re-ranking model is thereby constructed for each search tendency.

The re-ranking processing unit 107 is a part that performs a re-ranking process on highly ranked POIs (e.g., the top k number of POIs) in the search result list. The re-ranking processing unit 107 performs the re-ranking process by using a re-ranking model generated by the re-ranking model generation unit 105. A plurality of re-ranking models are prepared for different search tendencies of users. The log information related to a user's search stored in the log database 109 is classified into clusters indicating the search tendencies by the clustering unit 104, and each re-ranking model is learned and generated on the basis of the log information classified into clusters.

The output unit 108 outputs the search result list on which the re-ranking process is done by the re-ranking processing unit 107 to the user terminal 200 that has input the character string.

The log database 109 is a part that stores the log information containing a character string input by the user terminal 200 and its search result for each user. FIG. 2 is a view showing a specific example of the log information stored in the log database 109. As shown therein, the log database 109 stores a search query, which is a character string to be searched for, a search result list searched with the search query, a POI (URL or contents) selected by a user from the search result list, and attribute information of a user (age, address, and occupation) in association with one another.

Figure 3:
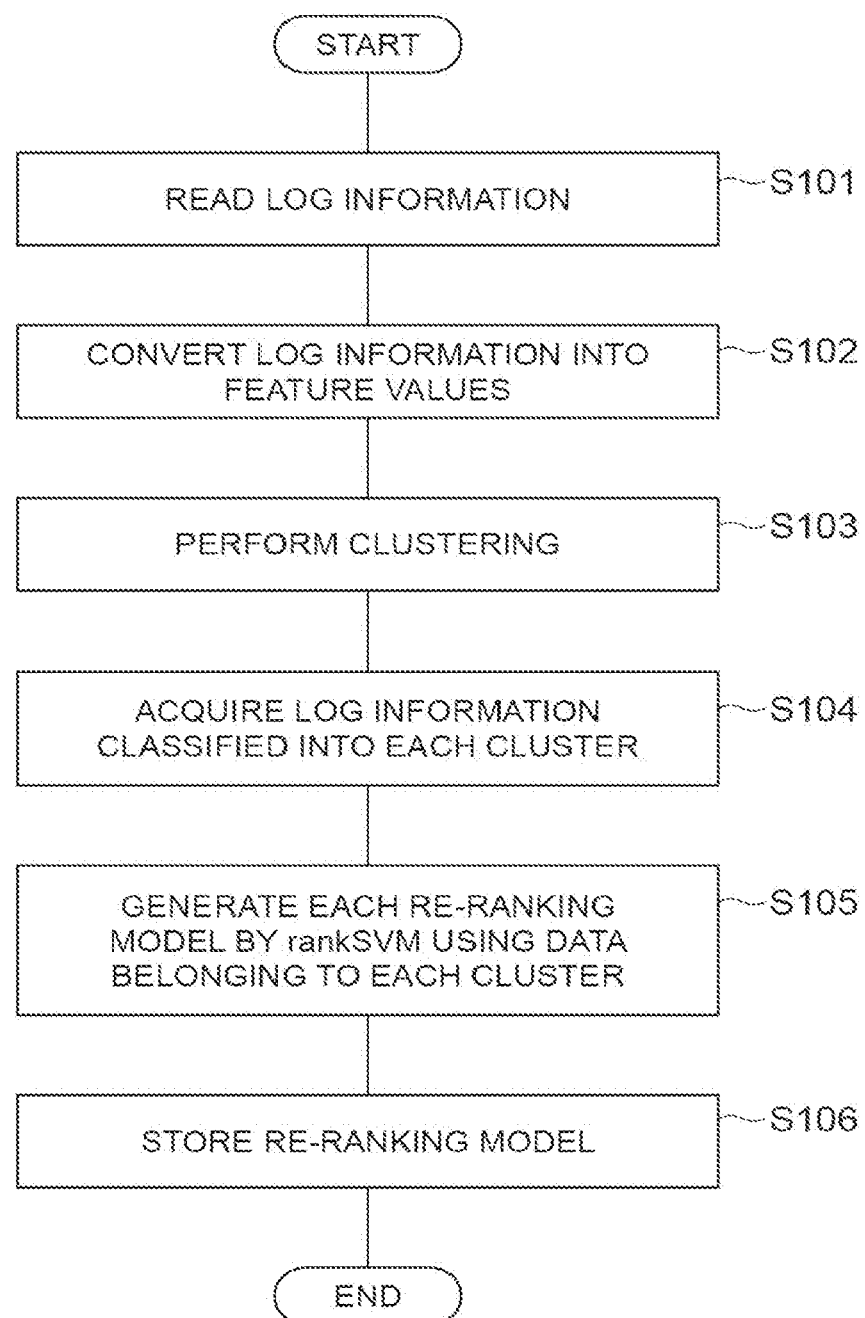
FIG. 3 is a flowchart showing an operation of the re-ranking device 100 when generating a re-ranking model according to this embodiment.

Next, an operation of the re-ranking device 100 during generation of a re-ranking model according to this embodiment is described hereinafter. FIG. 3 is a flowchart showing an operation of the re-ranking device 100 according to this embodiment. The re-ranking model generation unit 105 according to this embodiment reads the log information stored in the log database 109 (S101) and converts them into feature values (S102). The conversion into feature values is to obtain user's search query, a click log at the time, the degree of matching or a difference in character string between the search query and the click log (POI title, etc.), the amount of unnecessary character strings, the content of hiragana, the number of words, the type of a communication terminal used, or a voice search use flag, and so on. Note that it is not necessary to obtain all of those feature values. Besides such information, any information indicating a user's search tendency may be used.

The clustering unit 104 performs unsupervised clustering by k-means or the like with use of the information indicating the search tendencies obtained by converting the log information into feature values (S103). FIG. 7(a) is a schematic view thereof. In FIG. 7, a black circle indicates a feature value representing a user's search tendency. Information is classified into several clusters on the basis of each feature value. In FIG. 7, information is classified into clusters 1 and 2.

Then, the re-ranking model generation unit 105 acquires the log information for each cluster (S104). The re-ranking model generation unit 105 generates a re-ranking model by applying the log information (the search query, the click log (clicked POI), and the search result list) belonging to each cluster to rankSVM (S105). The re-ranking model generation unit 105 stores the generated re-ranking model into the re-ranking model storage unit 106. At this time, the re-ranking model is labeled to show on which cluster this model is based. This allows selecting the re-ranking model corresponding to the estimated cluster during search.

FIG. 4 is a view schematically showing a re-ranking model generation process. FIG. 4(a) is a view showing feature values extracted from log information. For the purpose of illustration, feature values representing the degree of matching and a difference, and a feature value indicating the content of hiragana are used in this example. FIG. 4(b) shows the feature values of each cluster obtained by clustering. FIGS. 4(c) and 4(d) schematically show generating a re-ranking model on the basis of the log information of each cluster obtained by clustering. A re-ranking model is generated on the basis of the search query, the click log, and the search result list contained in each log information. Although the user attribute is also contained in the figure, it is not essential.

In this manner, a re-ranking model based on users' search tendencies is generated.

Figure 5:
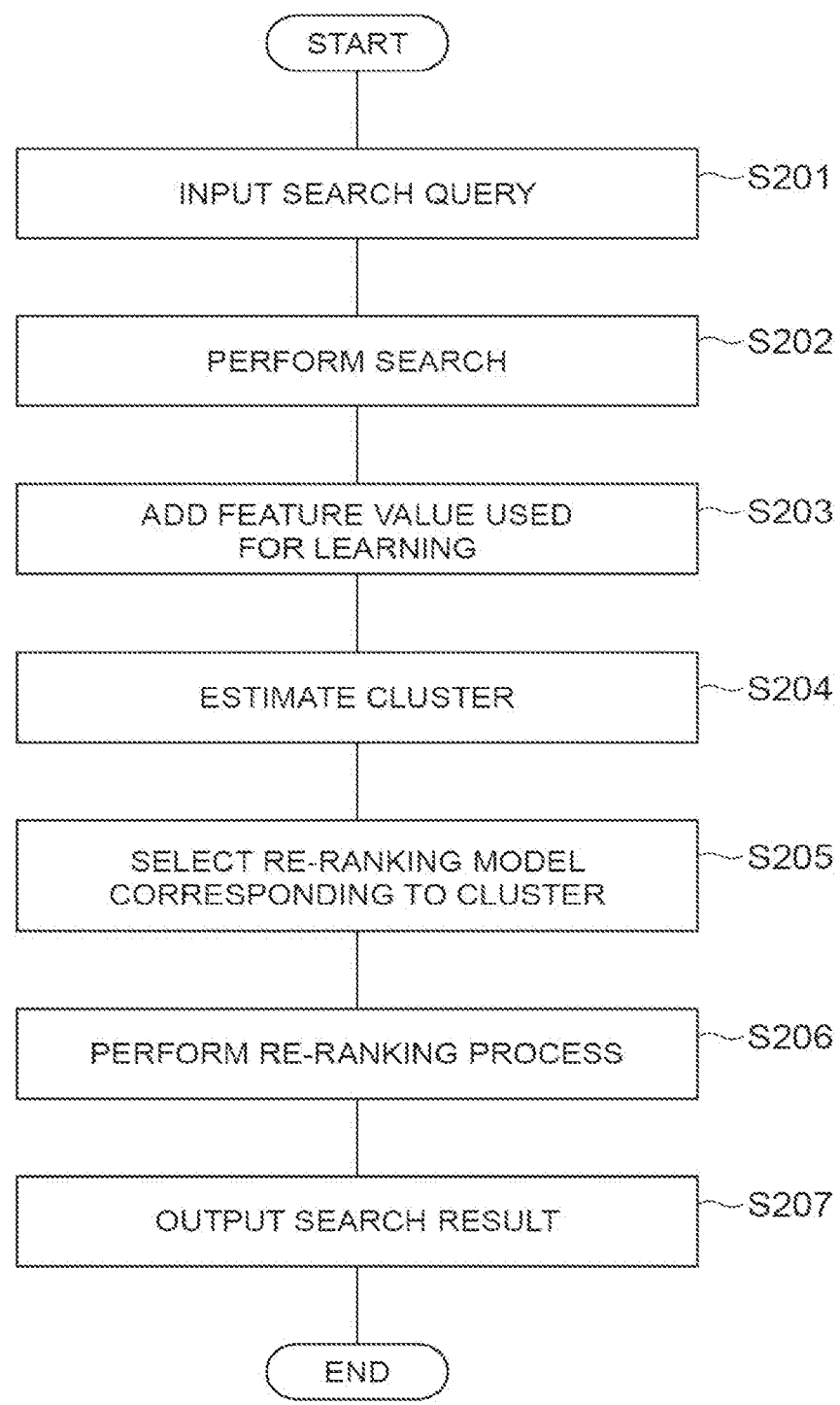
FIG. 5 is a flowchart showing an operation of the re-ranking device 100 when performing a re-ranking process according to this embodiment.

A re-ranking search operation using a re-ranking model generated on the basis of users' search tendencies is described hereinbelow. FIG. 5 is a flowchart showing an operation of the re-ranking device 100 when performing a re-ranking process according to this embodiment. In the re-ranking device 100, the input unit 101 receives a search query from a user (S201), and the search unit 102 performs a POI search and acquires a search result list (S202). Then, the re-ranking processing unit 107 acquires feature values from the search query, and identifies which item is a remainder of the feature values used when generating the re-ranking model, and adds this feature value (S203). This addition is to make the dimension of the feature values used in the clustering process during generation of the re-ranking model consistent with the dimension of the feature values for cluster estimation during search. For example, in the case where clustering is done using the degree of matching and a difference in character strings between the search query and the clicked content as the feature values when generating the re-ranking model, the degree of matching and the difference in character strings are added as the feature values also when making a search, which allows the dimension to be consistent as to which cluster this user's search tendency belongs to when estimating a cluster.

In this embodiment, the search query and the clicked content are stored for each user in the log database 109, and a feature value different from the feature value obtained from the search query is added using the stored information. For example, the degree of matching in character strings and a difference in character strings between the search query and the clicked POI in the past searches of this user are acquired from the log database 109, and a value obtained by statistically processing them (such as calculating the average value) is added as the feature value. The other feature values are also generated from the log information and added in the same manner.

Then, the re-ranking processing unit 107 performs cluster estimation of the user (S204). This estimation process is performed by determining to which cluster the user's search tendency belongs on the basis of the already clustered log information. FIG. 7(*b*) shows that a feature value x (including one to which the above-described feature value is added) representing the search tendency based on the search query or the like is included in the cluster 1.

Figure 6:
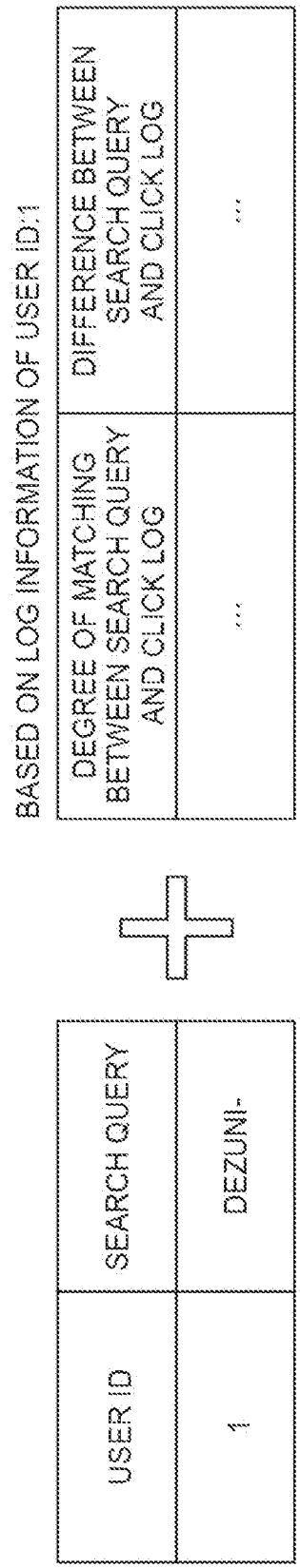
FIG. 6 is a schematic diagram showing a feature value adding process.

The addition of a feature value and the cluster estimation of a user are described hereinafter with reference to the figure. FIG. 6 is a view schematically showing the addition of a feature value. It is assumed in this example that the degree of matching and a difference between a search query and a click log are used as feature values during generation of a re-ranking model. In the case where another feature value is used, this feature value is also acquired from the search query or this user's search log.

As shown in FIG. 6, a user with a user ID: 1 (which is referred to hereinafter as a user 1) enters "Dezuni-" (Japanese phonetic for the word "Disney") as a search query. Although the search tendency of the user 1 is not known here, the degree of matching and a difference between the search query and the click log are acquired from the past search history of the user 1. Since the user 1 generally makes a plurality of searches, the degree of matching and the difference are acquired by statistical processing (average calculation, etc.) in this case. Note that, however, the degree of matching and the difference in the most recent search may be used instead.

The degree of matching and the difference between the past search query and the click log acquired from the search history are combined with the search query, and then the feature value representing the search tendency of the user 1 is extracted. Using this value, the re-ranking processing unit 107 is able to estimate the cluster of this user.

The re-ranking processing unit 107 selects a re-ranking model corresponding to the estimated cluster (S205), and performs a re-ranking process of the search result list acquired by the search unit 102 (S206). The output unit 108 outputs the search result list on which the re-ranking process has been performed to the user terminal 200 (S207).

The operational advantages of the re-ranking device 100 according to this embodiment are described hereinbelow. The re-ranking device 100 includes the input unit 101 that receives a search query from one user terminal 200, the re-ranking model storage unit 106 that stores a plurality of re-ranking models prepared in accordance with common information of a plurality of users, the search unit 102 that performs a search on the basis of the search query and obtains a search result, and the re-ranking processing unit 107 that selects one re-ranking model on the basis of common information of one user and performs a re-ranking process on the search result using the one re-ranking model. The common information is a search tendency of a user or a user attribute.

This allows the re-ranking processing unit 107 to select a re-ranking model in accordance with common information (user attributes or search tendencies) of a plurality of users, and thereby perform a re-ranking process using this model. The re-ranking model is prepared in accordance with the common information (user attributes or search tendencies) of a plurality of users, which enables a re-ranking process according to each user. Further, since the re-ranking model is prepared in accordance with the common information (user attributes or search tendencies) of a plurality of users, the problem of shortage of data during generation of the model is solved compared with the case where the re-ranking model is prepared for each user.

Further, the re-ranking device 100 according to this embodiment includes the log database 109 that stores log information containing a search query, a search result list by the search query, and a click log selected by a user, the clustering unit 104 that classifies the log information on the basis of common information (user attributes or search tendencies) of a plurality of users, and the re-ranking model generation unit 105 that generates a plurality of re-ranking models on the basis of the log information classified on the basis of the common information (user attributes or search tendencies). Then, the re-ranking processing unit 107 selects one re-ranking model from the plurality of re-ranking models generated by the re-ranking model generation unit 105, and performs the re-ranking process.

This enables generation of a re-ranking model on the basis of the common information. The common information may be user attributes or search tendencies, and by clustering the log information on the basis of such common information and generating a re-ranking model for each cluster, generation of a re-ranking model is achieved with no shortage of data.

In the re-ranking device 100 according to this embodiment, the re-ranking processing unit 107 derives a search tendency from the search query received by the input unit 101 and the search history of one user. Specifically, the re-ranking processing unit 107 extracts a feature value from the search query and further extracts, from the search history of the one user, another feature value different from the feature value extracted from the search query, and thereby derives a search tendency of the one user. The feature from the search query and the another feature value are preferably the same as the feature value used for clustering when generating the ranking model. The search history may be acquired from the log database 109, for example, or information when generating the re-ranking model may be used.

As described above, by extracting a feature value from the search query, and extracting a feature value as complementary information from the search history so as to grasp the search tendency of this one user, the search tendency of the one user during search is estimated, and the re-ranking model is selected in accordance with this search tendency.

In this embodiment, the search tendency is based on an association between a search query and a click log. The association is at least one of the number of character strings in each of the search query and the click log, the degree of matching in character strings between them, and a difference in character strings between them. Further, the search tendency is based on at least one of the type of characters forming the search query, a character string in the search query, and the number of characters of a character string not used for search in the search query.

The search tendency is based on a means of inputting a search query. It may be text input with a keyboard or voice input. In the case of voice input, it is necessary to convert the voice into a character string in the re-ranking device 100 so as conform to the format of a search query. Further, when voice is input and converted on the user terminal side, flag information indicating that may be provided.

Although the search tendencies of users are used as an example of the common information in the above-described embodiment, information representing user attributes may be used as the common information. The information representing the user attributes may be gender, age or age group, address, occupation and the like. Further, the common information may contain both of the search tendencies and the user attributes.

The block diagram used for the description of the above embodiments shows blocks of functions. Those functional blocks (component parts) are implemented by any combination of at least one of hardware and software. Further, a means of implementing each functional block is not particularly limited. Specifically, each functional block may be implemented by one physically or logically combined device or may be implemented by two or more physically or logically separated devices that are directly or indirectly connected (e.g., by using wired or wireless connection etc.). The functional blocks may be implemented by combining software with the above-described one device or the above-described plurality of devices.

The functions include determining, deciding, judging, calculating, computing, processing, deriving, investigating, looking up/searching/inquiring, ascertaining, receiving, transmitting, outputting, accessing, resolving, selecting, choosing, establishing, comparing, assuming, expecting, considering, broadcasting, notifying, communicating, forwarding, configuring, reconfiguring, allocating/mapping, assigning and the like, though not limited thereto. For example, the functional block (component part) that implements the function of transmitting is referred to as a transmitting unit or a transmitter. In any case, a means of implementation is not particularly limited as described above.

Figure 8:
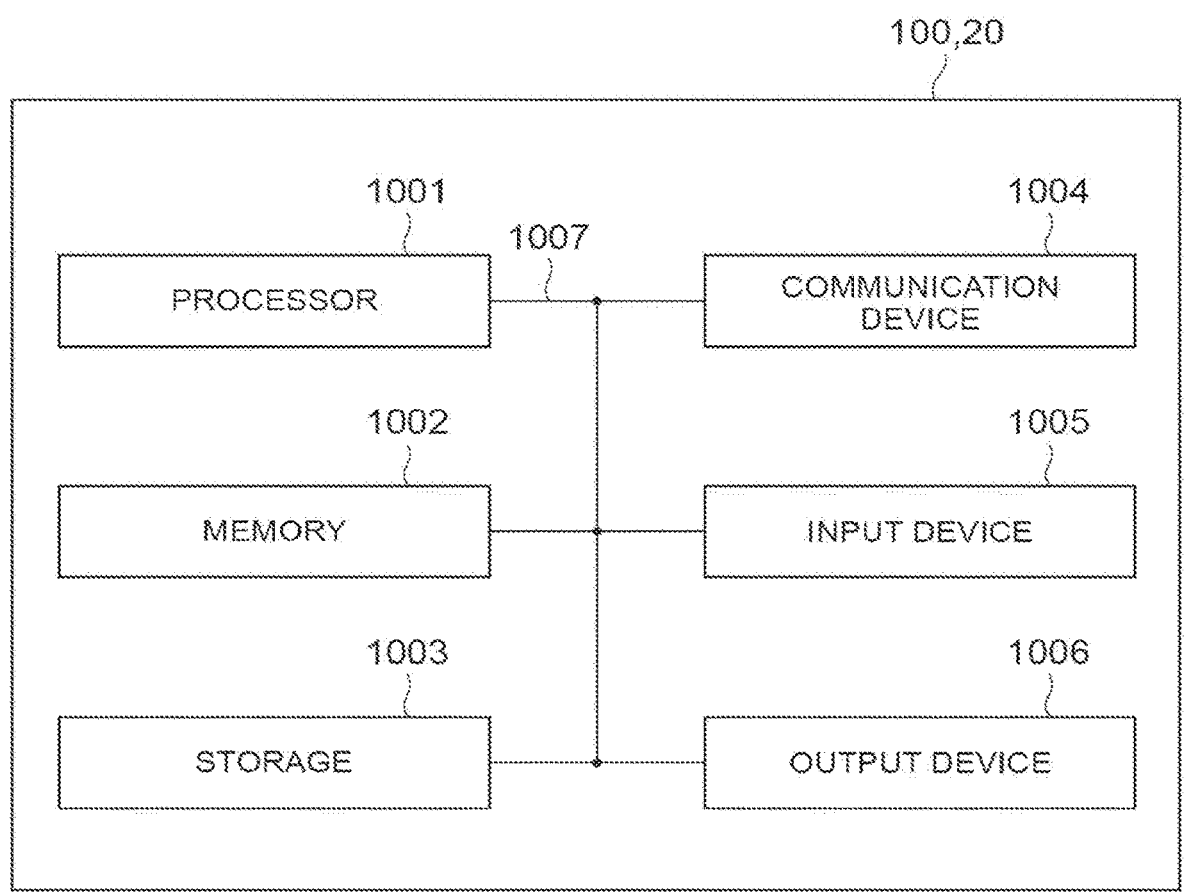
FIG. 8 is a view showing an example of a hardware configuration of the re-ranking device 100 according to one embodiment of the present disclosure.

For example, the re-ranking device 100 according to one embodiment of the present disclosure may function as a computer that performs a processing of the re-ranking processing method in an interactive process according to the present disclosure. FIG. 8 is a view showing an example of the hardware configuration of the re-ranking device 100 according to one embodiment of the present disclosure. The interactive system 100 described above may be physically configured as a computer device that includes a processor 1001, a memory 1002, a storage 1003, a communication device 1004, an input device 1005, an output device 1006, a bus 1007 and the like.

In the following description, the term "device" may be replaced with a circuit, a device, a unit, or the like. The hardware configuration of the re-ranking device 100 may be configured to include one or a plurality of the devices shown in the drawings or may be configured without including some of those devices.

The functions of the re-ranking device 100 may be implemented by loading predetermined software (programs) on hardware such as the processor 1001 and the memory 1002, so that the processor 1001 performs computations to control communications by the communication device 1004 and control at least one of reading and writing of data in the memory 1002 and the storage 1003.

The processor 1001 may, for example, operate an operating system to control the entire computer. The processor 1001 may be configured to include a CPU (Central Processing Unit) including an interface with a peripheral device, a control device, an arithmetic device, a register and the like. For example, the search unit 102, the re-ranking model generation unit 105, the clustering unit 104, and the like described above may be implemented by the processor 1001.

Further, the processor 1001 loads a program (program code), a software module and data from at least one of the storage 1003 and the communication device 1004 into the memory 1002 and performs various processing according to them. As the program, a program that causes a computer to execute at least some of the operations described in the above embodiments is used. For example, the search unit 102 may be implemented by a control program that is stored in the memory 1002 and operates on the processor 1001, and the other functional blocks may be implemented in the same way. Although the above-described processing is executed by one processor 1001 in the above description, the processing may be executed simultaneously or sequentially by two or more processors 1001. The processor 1001 may be implemented in one or more chips. Note that the program may be transmitted from a network through a telecommunications line.

The memory 1002 is a computer-readable recording medium, and it may be composed of at least one of ROM (Read Only Memory), EPROM (ErasableProgrammable ROM), EEPROM (Electrically ErasableProgrammable ROM), RANI (Random Access Memory) and the like, for example. The memory 1002 may be also called a register, a cache, a main memory (main storage device) or the like. The memory 1002 can store a program (program code), a software module and the like that can be executed for implementing a re-ranking processing method according to one embodiment of the present disclosure.

The storage 1003 is a computer-readable recording medium, and it may be composed of at least one of an optical disk such as a CD-ROM (Compact Disk ROM), a hard disk drive, a flexible disk, a magneto-optical disk (e.g., a compact disk, a digital versatile disk, and a Blu-ray (registered trademark) disk), a smart card, a flash memory (e.g., a card, a stick, and a key drive), a floppy (registered trademark) disk, a magnetic strip and the like, for example. The storage 1003 may be called an auxiliary storage device. The above-described storage medium may be a database, a server, or another appropriate medium including the memory 1002 and/or the storage 1003, for example.

The communication device 1004 is hardware (a transmitting and receiving device) for performing communication between computers via at least one of a wired network and a wireless network, and it may also be referred to as a network device, a network controller, a network card, a communication module, or the like. The communication device 1004 may include a high-frequency switch, a duplexer, a filter, a frequency synthesizer or the like in order to implement at least one of FDD (Frequency Division Duplex) and TDD (Time Division Duplex), for example. For example, the above-described input unit 101 and the output unit 108 or the like may be implemented by the communication device 1004. The input unit 101 and the output unit 108 may be implemented in a physically or logically separate manner, or may be physically implemented in common.

The input device 1005 is an input device (e.g., a keyboard, a mouse, a microphone, a switch, a button, a sensor, etc.) that receives an input from the outside. The output device 1006 is an output device (e.g., a display, a speaker, an LED lamp, etc.) that makes output to the outside. Note that the input device 1005 and the output device 1006 may be integrated (e.g., a touch panel).

In addition, the devices such as the processor 1001 and the memory 1002 are connected by the bus 1007 for communicating information. The bus 1007 may be a single bus or may be composed of different buses between different devices.

Further, the re-ranking device 100 may include hardware such as a microprocessor, a DSP (Digital Signal Processor), an ASIC (Application Specific Integrated Circuit), a PLD (Programmable Logic Device), and an FPGA (Field Programmable Gate Array), and some or all of the functional blocks may be implemented by the above-described hardware components. For example, the processor 1001 may be implemented with at least one of these hardware components.

Notification of information may be made by another method, not limited to the aspects/embodiments described in the present disclosure. For example, notification of information may be made by physical layer signaling (e.g., DCI (Downlink Control Information), UCI (Uplink Control Information)), upper layer signaling (e.g., RRC (Radio Resource Control) signaling, MAC (Medium Access Control) signaling, annunciation information (MIB (Master Information Block), SIB (System Information Block))), another signal, or a combination of them. Further, RRC signaling may be called an RRC message, and it may be an RRC Connection Setup message, an RRC Connection Reconfiguration message or the like, for example.

Further, each of the aspects/embodiments described in the present disclosure may be applied to at least one of a system using LTE (Long Term Evolution), LTE-A (LTE Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra Wide Band), Bluetooth (registered trademark), or another appropriate system and a next generation system extended on the basis of these systems. Further, a plurality of systems may be combined (e.g., a combination of at least one of LTE and LTE-A, and 5G) for application.

The procedure, the sequence, the flowchart and the like in each of the aspects/embodiments described in the present disclosure may be in a different order unless inconsistency arises. For example, for the method described in the present disclosure, elements of various steps are described in an exemplified order, and it is not limited to the specific order described above.

The information or the like can be output from an upper layer (or lower layer) to a lower layer (or upper layer). It may be input and output through a plurality of network nodes.

Input/output information or the like may be stored in a specific location (e.g., memory) or managed in a management table. Further, input/output information or the like can be overwritten or updated, or additional data can be written. Output information or the like may be deleted. Input information or the like may be transmitted to another device.

The determination may be made by a value represented by one bit (0 or 1), by a truth-value (Boolean: true or false), or by numerical comparison (e.g., comparison with a specified value).

Each of the aspects/embodiments described in the present disclosure may be used alone, may be used in combination, or may be used by being switched according to the execution. Further, a notification of specified information (e.g., a notification of "being X") is not limited to be made explicitly, and it may be made implicitly (e.g., a notification of the specified information is not made).

Although the present disclosure is described in detail above, it is apparent to those skilled in the art that the present disclosure is not restricted to the embodiments described in this disclosure. The present disclosure can be implemented as a modified and changed form without deviating from the spirit and scope of the present disclosure defined by the appended claims. Accordingly, the description of the present disclosure is given merely by way of illustration and does not have any restrictive meaning to the present disclosure.

Software may be called any of software, firmware, middleware, microcode, hardware description language or another name, and it should be interpreted widely so as to mean an instruction, an instruction set, a code, a code segment, a program code, a program, a sub-program, a software module, an application, a software application, a software package, a routine, a sub-routine, an object, an executable file, a thread of execution, a procedure, a function and the like.

Further, software, instructions and the like may be transmitted and received via a transmission medium. For example, when software is transmitted from a website, a server or another remote source using at least one of wired technology (a coaxial cable, an optical fiber cable, a twisted pair and a digital subscriber line (DSL) etc.) and wireless technology (infrared rays, microwave etc.), at least one of those wired technology and wireless technology are included in the definition of the transmission medium.

The information, signals and the like described in the present disclosure may be represented by any of various different technologies. For example, data, an instruction, a command, information, a signal, a bit, a symbol, a chip and the like that can be referred to in the above description may be represented by a voltage, a current, an electromagnetic wave, a magnetic field or a magnetic particle, an optical field or a photon, or an arbitrary combination of them.

Note that the term described in the present disclosure and the term needed to understand the present disclosure may be replaced by a term having the same or similar meaning.

Further, information, parameters and the like described in the present disclosure may be represented by an absolute value, a relative value to a specified value, or corresponding different information. For example, radio resources may be indicated by an index.

The names used for the above-described parameters are not definitive in any way. Further, mathematical expressions and the like using those parameters are different from those explicitly disclosed in the present disclosure in some cases. Because various channels (e.g., PUCCH, PDCCH etc.) and information elements (e.g., TPC etc.) can be identified by every appropriate names, various names assigned to such various channels and information elements are not definitive in any way.

In the present disclosure, the terms such as "Mobile Station (MS)" "user terminal", "User Equipment (UE)" and "terminal" can be used to be compatible with each other.

The mobile station can be also called, by those skilled in the art, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or several other appropriate terms.

Note that the term "determining" and "determining" used in the present disclosure includes a variety of operations. For example, "determining" and "determining" can include regarding the act of judging, calculating, computing, processing, deriving, investigating, looking up/searching/inquiring (e.g., looking up in a table, a database or another data structure), ascertaining or the like as being "determined" and "determined". Further, "determining" and "determining" can include regarding the act of receiving (e.g., receiving information), transmitting (e.g., transmitting information), inputting, outputting, accessing (e.g., accessing data in a memory) or the like as being "determined" and "determined". Further, "determining" and "determining" can include regarding the act of resolving, selecting, choosing, establishing, comparing or the like as being "determined" and "determined". In other words, "determining" and "determining" can include regarding a certain operation as being "determined" and "determined". Further, "determining (determining)" may be replaced with "assuming", "expecting", "considering" and the like.

The term "connected", "coupled" or every transformation of this term means every direct or indirect connection or coupling between two or more elements, and it includes the case where there are one or more intermediate elements between two elements that are "connected" or "coupled" to each other. The coupling or connection between elements may be physical, logical, or a combination of them. For example, "connect" may be replaced with "access". When used in the present disclosure, it is considered that two elements are "connected" or "coupled" to each other by using at least one of one or more electric wires, cables, and printed electric connections and, as several non-definitive and non-comprehensive examples, by using electromagnetic energy such as electromagnetic energy having a wavelength of a radio frequency region, a microwave region and an optical (both visible and invisible) region.

The description "on the basis of" used in the present disclosure does not mean "only on the basis of" unless otherwise noted. In other words, the description "on the basis of" means both of "only on the basis of" and "at least on the basis of".

As long as "include", "including" and transformation of them are used in the present disclosure, those terms are intended to be comprehensive like the term "comprising". Further, the term "or" used in the present disclosure is intended not to be exclusive OR.

In the present disclosure, when articles, such as "a", "an", and "the" in English, for example, are added by translation, the present disclosure may include that nouns following such articles are plural.

In the present disclosure, the term "A and B are different" may mean that "A and B are different from each other". Note that this term may mean that "A and B are different from C".

The terms such as "separated" and "coupled" may be also interpreted in the same manner

REFERENCE SIGNS LIST

100 . . . re-ranking device, 101 . . . input unit, 102 . . . search unit, 103 . . . index unit, 104 . . . clustering unit, 105 . . . re-ranking model generation unit, 106 . . . re-ranking model storage unit, 107 . . . re-ranking processing unit, 108 . . . output unit, 109 . . . log database, 200 . . . user terminal

The invention claimed is:

1. A re-ranking device comprising:
an input unit, implemented by circuitry, configured to receive a search query from one user;
a plurality of re-ranking models prepared in accordance with common information of a plurality of users;
a search unit, implemented by the circuitry, configured to perform a search on the basis of the search query and obtain a search result;
a re-ranking processing unit, implemented by the circuitry, configured to select one re-ranking model on the basis of common information of the one user, and perform a re-ranking process on the search result using the one re-ranking model;
a log database configured to store log information containing a search query, a search result list by the search query, and a click log selected by a user;
a clustering unit, implemented by the circuitry, configured to classify the log information on the basis of common information of a plurality of users; and
a re-ranking model generation unit, implemented by the circuitry, configured to generate the plurality of re-ranking models on the basis of the log information classified on the basis of the common information, wherein
the re-ranking processing unit selects one re-ranking model from the plurality of re-ranking models generated by the re-ranking model generation unit, and performs the re-ranking process.

2. The re-ranking device according to claim 1, wherein the common information is information indicating a search tendency of a user.

3. The re-ranking device according to claim 2, wherein the re-ranking processing unit derives a search tendency from a search query received by the input unit and a search history of the one user.

4. The re-ranking device according to claim 3, wherein
the search tendency includes an association between a search query and a click log, and
the re-ranking processing unit derives the search tendency by deriving the association from the search history of the one user.

5. The re-ranking device according to claim 4, wherein the association is at least one of the number of character strings in each of the search query and the click log, the degree of matching in character strings between the search query and the click log, and a difference in character strings between the search query and the click log.

6. The re-ranking device according to claim 5, wherein the search tendency is based on at least one of the type of characters forming the search query, a character string in the search query, and the number of characters of a character string not used for search.

7. The re-ranking device according to claim 3, wherein the search tendency is based on at least one of the type of characters forming the search query, a character string in the search query, and the number of characters of a character string not used for search.

8. The re-ranking device according to claim 3, wherein the search tendency is based on a means of inputting the search query.

9. The re-ranking device according to claim 1, wherein the common information is information indicating user attributes.

10. The re-ranking device according to claim 4, wherein the search tendency is based on a means of inputting the search query.

11. The re-ranking device according to claim 5, wherein the search tendency is based on a means of inputting the search query.

12. The re-ranking device according to claim 4, wherein the search tendency is based on at least one of the type of characters forming the search query, a character string in the search query, and the number of characters of a character string not used for search.

13. The re-ranking device according to claim 1, wherein the re-ranking model is generated by machine learning using a search query and a search result list as explanatory variables and a clicked POI as a response variable.

14. A re-ranking device comprising:
  an input unit, implemented by circuitry, configured to receive a search query from one user;
  a plurality of re-ranking models prepared in accordance with common information of a plurality of users;
  a search unit, implemented by the circuitry, configured to perform a search on the basis of the search query and obtain a search result; and
  a re-ranking processing unit, implemented by the circuitry, configured to select one re-ranking model on the basis of common information of the one user, and perform a re-ranking process on the search result using the one re-ranking model,
  wherein
  the common information is information indicating a search tendency of a user,
  the re-ranking processing unit derives a search tendency from a search query received by the input unit and a search history of the one user;
  the search tendency includes an association between a search query and a click log,
  the re-ranking processing unit derives the search tendency by deriving the association from the search history of the one user,
  the association is at least one of the number of character strings in each of the search query and the click log, the degree of matching in character strings between the search query and the click log, and a difference in character strings between the search query and the click log, and
  the re-ranking model generation unit derives a search tendency based on at least one of a degree of coincidence or a difference in the number of characters of a search query and a click log, clusters log information including the search query, the search result list and the click log based on the search tendency, and generates the re-ranking models using the search query and the search result list as an explanatory variable and the click log as a response variable.

15. A method, implemented by circuitry of a re-ranking device, the method comprising:
  receiving, by an input unit, a search query from one user;
  storing plurality of re-ranking models prepared in accordance with common information of a plurality of users;
  searching, by a search unit, a search on the basis of the search query and obtain a search result;
  selecting, by a re-ranking processing unit, one re-ranking model on the basis of common information of the one user, and performing a re-ranking process on the search result using the one re-ranking model;
  wherein the method further includes
  storing a log database containing a search query, a search result list by the search query, and a click log selected by a user;
  classifying, by a clustering unit, the log information on the basis of common information of a plurality of users; and
  generating, by a re-ranking model generation unit, the plurality of re-ranking models on the basis of the log information classified on the basis of the common information, wherein
  selecting, by the re-ranking processing unit, one re-ranking model from the plurality of re-ranking models generated by the re-ranking model generation unit, and performs the re-ranking process.

* * * * *